(12) United States Patent
Zhang et al.

(10) Patent No.: US 11,229,017 B2
(45) Date of Patent: Jan. 18, 2022

(54) WIRELESS COMMUNICATION METHOD, NETWORK DEVICE, AND TERMINAL DEVICE

(71) Applicant: Huawei Technologies Co., Ltd., Shenzhen (CN)

(72) Inventors: Xi Zhang, Chengdu (CN); Minghui Xu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 16/579,347

(22) Filed: Sep. 23, 2019

(65) Prior Publication Data

US 2020/0022135 A1    Jan. 16, 2020

Related U.S. Application Data

(63) Continuation of application No. PCT/CN2018/079069, filed on Mar. 15, 2018.

(30) Foreign Application Priority Data

Mar. 24, 2017   (CN) .......................... 201710184424.1

(51) Int. Cl.
*H04W 72/04* (2009.01)
*H04B 17/10* (2015.01)
(Continued)

(52) U.S. Cl.
CPC ...... *H04W 72/0413* (2013.01); *H04B 17/104* (2015.01); *H04B 17/345* (2015.01); *H04L 5/0057* (2013.01); *H04W 72/082* (2013.01)

(58) Field of Classification Search
CPC ............ H04W 72/0413; H04W 72/082; H04B 17/104; H04B 17/345; H04L 5/0057
See application file for complete search history.

(56) References Cited

U.S. PATENT DOCUMENTS 11,082,179 B2 *  8/2021  Chen ..................... H04L 5/0048
2014/0119228 A1  5/2014  Wang et al.
(Continued)

FOREIGN PATENT DOCUMENTS

| CN | 102869105 A | 1/2013 |
| WO | 2016000915 A1 | 1/2016 |
| WO | 2018052603 A1 | 3/2018 |

OTHER PUBLICATIONS

"On RS for Phase Tracking," 3GPP TSG-RAN WG1 #88, Athens, Greece, R1-1702213, XP051209371, pp. 1-4, 3rd Generation Partnership Project, Valbonne, France (Feb. 13-17, 2017).

(Continued)

*Primary Examiner* — Michael J Moore, Jr.
(74) *Attorney, Agent, or Firm* — Leydig, Voit & Mayer, Ltd.

(57) ABSTRACT

A wireless communication method, including: obtaining, by a network device, at least one of information that is about sharing a local oscillator by a plurality of transceiver units and that is sent by a terminal device, information that is about phase noise errors measured on a plurality of phase tracking reference signal ports and that is sent by the terminal device, isolation between a plurality of channels used to carry phase tracking reference signals, and status information of the channels used to carry the phase tracking reference signals; determining port configuration information of a phase tracking reference signal based on the at least one of the information about sharing a local oscillator, the information about the phase noise errors, the isolation between the plurality of channels used to carry the phase tracking reference signals, and the status information of the channels used to carry the phase tracking reference signals.

12 Claims, 5 Drawing Sheets

(51) Int. Cl.
  *H04B 17/345*   (2015.01)
  *H04L 5/00*   (2006.01)
  *H04W 72/08*   (2009.01)

(56) References Cited

U.S. PATENT DOCUMENTS

| | | | |
|---|---|---|---|
| 2018/0041259 A1* | 2/2018 | Kim | H04L 25/0224 |
| 2018/0077603 A1* | 3/2018 | Wilson | H04W 72/0406 |
| 2018/0091350 A1* | 3/2018 | Akkarakaran | H04L 27/2613 |
| 2018/0227929 A1* | 8/2018 | Yoo | H04W 72/085 |
| 2018/0323933 A1* | 11/2018 | Nam | H04W 72/12 |
| 2018/0351719 A1* | 12/2018 | Lee | H04L 1/00 |
| 2019/0052433 A1* | 2/2019 | Yoo | H04L 5/0053 |
| 2019/0097776 A1* | 3/2019 | Kim | H04L 27/2611 |
| 2020/0052930 A1* | 2/2020 | Kim | H04L 25/0226 |
| 2020/0244415 A1* | 7/2020 | Liu | H04L 5/00 |
| 2020/0287751 A1* | 9/2020 | Lee | H04L 25/0204 |

OTHER PUBLICATIONS

"On the PTRS design for NR," 3GPP TSG RAN WG1 NR Ad-Hoc Meeting, Spokane, USA, R1-1701105, XP051208619, pp. 1-15, 3rd Generation Partnership Project, Valbonne, France (Jan. 16-20, 2017).

"Discussion on phase tracking RS for NR," 3GPP TSG RAN WG1 Meeting #87, Reno, USA, R1-1611382, XP051175363, pp. 1-3, 3rd Generation Partnership Project, Valbonne, France (Nov. 14-18, 2016).

"Further Details for PT-RS Design", 3GPP TSG RAN WG1 Meeting Ad Hoc for NRR1-1700073, pp. 1-5, 3rd Generation Partnership Project, Valbonne, France (Jan. 9, 2017).

"Verizon 5G TF; Air Interface Working Group; Verizon 5th Generation Radio Access; Physical layer procedures (Release 1)," TS V5G.213 v1.4, pp. 1-50 (Oct. 2016).

"Verizon 5G TF; Air Interface Working Group; Verizon 5th Generation Radio Access; Multiplexing and channel coding (Release 1)," TS V5G.212 v1.5, pp. 1-60 (Sep. 2016).

"Verizon 5G TF; Air Interface Working Group; Verizon 5th Generation Radio Access; Physical channels and modulation (Release 1)," TS V5G.211 v1.7, pp. 1-83 (Oct. 2016).

* cited by examiner

WIRELESS COMMUNICATION METHOD, NETWORK DEVICE, AND TERMINAL DEVICE

CROSS-REFERENCE TO RELATED APPLICATIONS

This application is a continuation of International Application No. PCT/CN2018/079069, filed on Mar. 15, 2018, which claims priority to Chinese Patent Application No. 201710184424.1, filed on Mar. 24, 2017. The disclosures of the aforementioned applications are hereby incorporated by reference in their entireties.

TECHNICAL FIELD

This application relates to the field of communications, and more specifically, to a communication method, a network device, and a terminal device.

BACKGROUND

In an existing wireless communications network, fewer operating frequency bands with a frequency range below 6 GHz are available, and increasing communication requirements cannot be met. In a next-generation wireless communications network (for example, 5G), an operating frequency band of a communications system is above 6 GHz. Therefore, the next-generation wireless communications network has a significant characteristic of a high-frequency communications system, thereby readily implementing a high throughput. However, compared with the existing wireless communications network, the next-generation wireless communications network operating in a range above 6 GHz will suffer severer intermediate radio frequency distortion, especially impact caused by a phase noise (PN). A higher phase noise level causes greater impact of a common phase error (CPE).

In the prior art, a demodulation reference signal (DMRS) and a phase tracking reference signal (PTRS) (also referred to as a phase compensation reference signal (PCRS)) are provided to jointly complete channel estimation, phase noise estimation, and data demodulation. In the prior art, PTRSs are consecutive in time domain and frequency division is applied to a plurality of ports in frequency domain, and the ports are fixed. When data bandwidth is large, a relatively large quantity of subcarriers are occupied and resource overheads are relatively high. In addition, in different scenarios, for example, in different phase noise levels and moving speeds, a design with fixed time and frequency density lacks flexibility.

Therefore, how to flexibly configure a PTRS, reduce a quantity of subcarriers occupied by the PTRS, reduce overheads of the PTRS, and improve spectral efficiency is an urgent problem to be resolved.

SUMMARY

This application provides a wireless communication method, a network device, and a terminal device, so that the network device can provide the terminal device with an optimal port configuration for a phase tracking reference signal, and a phase tracking reference signal port can be flexibly configured for different terminals under different channel conditions, thereby reducing overheads of the phase tracking reference signal while ensuring phase noise error compensation performance, and improving spectral efficiency.

According to a first aspect, a wireless communication method is provided, including: obtaining, by a network device, at least one of information that is about sharing a local oscillator by a plurality of transceiver units and that is sent by a terminal device, information that is about phase noise errors measured on a plurality of phase tracking reference signal ports and that is sent by the terminal device, isolation between a plurality of channels used to carry phase tracking reference signals, and status information of the channels used to carry the phase tracking reference signals, where the information about sharing a local oscillator by the plurality of transceiver units is a status of sharing a local oscillator unit by a plurality of receiving units in the plurality of transceiver units or a status of sharing a local oscillator unit by a plurality of receiving units in the plurality of transceiver units;

determining port configuration information of a phase tracking reference signal based on the at least one of the information about sharing a local oscillator by the plurality of transceiver units, the information that is about the phase noise errors measured on the plurality of phase tracking reference signal ports and that is sent by the terminal device, the isolation between the plurality of channels used to carry the phase tracking reference signals, and the status information of the channels used to carry the phase tracking reference signals; and sending the port configuration information of the phase tracking reference signal to the terminal device.

Therefore, in this application, the network device determines the port configuration information of the phase tracking reference signal based on the at least one of the information about sharing a local oscillator by the plurality of transceiver units of the terminal device, the information about the phase noise errors measured on the plurality of phase tracking reference signal ports, the isolation between the plurality of channels used to carry the phase tracking reference signals, and the status information of the channels used to carry the phase tracking reference signals. In this way, the network device can provide the terminal device with an optimal port configuration for a phase tracking reference signal, and a phase tracking reference signal port can be flexibly configured for different terminals under different channel conditions, thereby reducing overheads of the phase tracking reference signal while ensuring phase noise error compensation performance, and improving spectral efficiency.

Optionally, in an implementation of the first aspect, the obtaining, by a network device, at least one of information that is about sharing a local oscillator by a plurality of transceiver units and that is sent by a terminal device, information that is about phase noise errors measured on a plurality of phase tracking reference signal ports and that is sent by the terminal device, isolation between a plurality of channels used to carry phase tracking reference signals, and status information of the channels used to carry the phase tracking reference signals includes:

receiving the information that is about sharing a local oscillator by the plurality of transceiver units and that is sent by the terminal device, and estimating, based on a first reference signal on an uplink channel, the isolation between the plurality of channels and the status information of the channels.

Optionally, in an implementation of the first aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining a quantity of phase tracking reference signal ports based on the information about sharing a local oscillator by the plurality of transceiver units.

Optionally, in an implementation of the first aspect, the determining a quantity of phase tracking reference signal ports based on the information about sharing a local oscillator by the plurality of transceiver units includes: if the plurality of transceiver units share a local oscillator, determining that there is one phase tracking reference signal port for the plurality of transceiver units.

Optionally, in an implementation of the first aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes:

determining a quantity of phase tracking reference signal ports based on the information about the phase noise errors measured on the plurality of phase tracking reference signal ports.

Optionally, in an implementation of the first aspect, the determining a quantity of phase tracking reference signal ports based on the information about the phase noise errors measured on the plurality of phase tracking reference signal ports includes: if values of the phase noise errors measured on the plurality of phase tracking reference signal ports are less than a first threshold, determining that there is one phase tracking reference signal port.

Optionally, in an implementation of the first aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data.

Optionally, in an implementation of the first aspect, when the network device estimates isolation between a plurality of downlink channels used to carry phase tracking reference signals, the network device estimates the isolation between the plurality of downlink channels based on first reference signals on a plurality of uplink channels.

Optionally, in an implementation of the first aspect, the first reference signal is a sounding reference signal (SRS).

Optionally, in an implementation of the first aspect, the determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data includes:

receiving isolation, sent by the terminal device, between the plurality of channels used to carry the phase tracking reference signals; and determining, based on the isolation, sent by the terminal device, between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

Optionally, in an implementation of the first aspect, the determining, based on the received isolation, sent by the terminal device, between the plurality of channels used to carry the phase tracking reference signals, the orthogonal multiplexing manner applied to the plurality of ports that are configured to send the phase tracking reference signals includes: when the isolation between the plurality of channels used to carry the phase tracking reference signals meets a preset condition, applying non-orthogonal multiplexing to the plurality of ports of the phase tracking reference signals or applying non-orthogonal multiplexing to the phase tracking reference signal and data.

Optionally, in an implementation of the first aspect, the network device receives isolation, sent by the terminal device, between the plurality of downlink channels used to carry the phase tracking reference signals, where the terminal device estimates, based on a second reference signal on each of the plurality of channels used to carry the phase tracking reference signals, the isolation between the plurality of channels used to carry the phase tracking reference signals.

Optionally, in an implementation of the first aspect, the second reference signal is a demodulation reference signal.

Optionally, in an implementation of the first aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the status information of the channels used to carry the phase tracking reference signals, a mapping relationship between the phase tracking reference signal and a second reference signal.

Optionally, in an implementation of the first aspect, after the sending the port configuration information of the phase tracking reference signal to the terminal device, the method further includes:

sending the phase tracking reference signal to the terminal device based on the port configuration information of the phase tracking reference signal.

Optionally, in an implementation of the first aspect, the port configuration information of the phase tracking reference signal is determined based on the port configuration information, requested by the terminal device, of the phase tracking reference signal, and/or the isolation between the plurality of channels used to carry the phase tracking reference signals, and/or the status information of the channels used to carry the phase tracking reference signals.

Optionally, in an implementation of the first aspect, when the port configuration information that is of the phase tracking reference signal and that is determined based on the isolation between the plurality of channels used to carry the phase tracking reference signals or the status information of the channels used to carry the phase tracking reference signals is the same as the port configuration information, requested by the terminal device, of the phase tracking reference signal, acknowledgment information is sent to the terminal device; or when the port configuration information that is of the phase tracking reference signal and that is determined based on the isolation between the plurality of channels used to carry the phase tracking reference signals or the status information of the channels used to carry the phase tracking reference signals is different from the port configuration information, requested by the terminal device, of the phase tracking reference signal, the port configuration information, determined by the network device, of the phase tracking reference signal is sent to the terminal device.

Optionally, in an implementation of the first aspect, the port configuration information of the phase tracking reference signal is sent to the terminal device by using radio resource control signaling.

Optionally, in an implementation of the first aspect, before the port configuration information, requested by the terminal device, of the phase tracking reference signal, the isolation between the plurality of channels used to carry the phase tracking reference signals, or the status information of the channels used to carry the phase tracking reference signals is obtained, the method further includes:

receiving first information sent by the terminal device, where the first information is used by the terminal device to request a resource from the network device, and the resource is used by the terminal device to send, to the network device, the port configuration information, requested by the terminal device, of the phase tracking reference signal; and sending acknowledgment information to the terminal device for the first information, where the acknowledgment information is used to indicate the resource on which the terminal device sends the port configuration information, required by the terminal device, of the phase tracking reference signal.

Optionally, in an implementation of the first aspect, before the port configuration information, requested by the terminal device, of the phase tracking reference signal, the isolation between the plurality of channels used to carry the phase tracking reference signals, or the status information of the channels used to carry the phase tracking reference signals is obtained, the method further includes:

sending second information to the terminal device, where the second information is used to instruct the terminal device to feed back, to the network device, the port configuration information, requested by the terminal device, of the phase tracking reference signal.

Optionally, in an implementation of the first aspect, the network device sends third indication information to the terminal device, where the third indication information is used to indicate an effective time, sent by the network device to the terminal device, of the port configuration information of the phase tracking reference signal, and the effective time may be a period of time after the terminal device receives the port configuration information of the phase tracking reference signal, and the time may be expressed in slots and/or subframes and/or frames.

Optionally, in an implementation of the first aspect, when the quantity of ports for sending the phase tracking reference signals is less than a quantity of ports for sending first reference signals, and non-orthogonal multiplexing is applied to the phase tracking reference signal and data, quantities of valid resource elements used to transmit data are different at a plurality of transport layers, and the method further includes: when one transport block is mapped to a plurality of transport layers, matching a corresponding quantity of bits for each code block, where each code block is obtained by dividing the transport block based on a predetermined value; obtaining a quantity of quadrature amplitude modulation symbols of each code block; and performing, at the plurality of transport layers, layer mapping on the quadrature amplitude modulation symbols of the transport block based on a quantity of valid resource elements at each layer.

According to a second aspect, a wireless communication method is provided, including: determining, by a terminal device, at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals, where the information about sharing a local oscillator by the plurality of transceiver units is a status of sharing a local oscillator unit by a plurality of receiving units in the plurality of transceiver units or a status of sharing a local oscillator unit by a plurality of receiving units in the plurality of transceiver units; and sending, to a network device, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals, where the network device determines port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Therefore, in this application, the terminal device sends, to the network device, the at least one of the information about sharing a local oscillator by the plurality of transceiver units of the terminal device, the information about the phase noise errors measured on the plurality of phase tracking reference signal ports, the isolation between the plurality of channels used to carry the phase tracking reference signals, and the status information of the channels used to carry the phase tracking reference signals, so that the network device determines the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals. In this way, a PTRS port can be flexibly configured, and a quantity of ports for sending PTRSs can be reduced. Therefore, a quantity of subcarriers occupied by the PTRSs is reduced, and resource overheads are reduced.

Optionally, in an implementation of the second aspect, the terminal device sends, to the network device by using a radio resource control (RRC) report, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Optionally, in an implementation of the second aspect, after the sending, to a network device, the at least one of the information about sharing a local oscillator by the plurality of transceiver units, the isolation between the plurality of channels used to carry the phase tracking reference signals, and the status information of the channels used to carry the phase tracking reference signals, the method further includes: receiving port configuration information, sent by the network device, of the phase tracking reference signal; and receiving, based on the port configuration information of the phase tracking reference signal, the phase tracking reference signal sent by the network device.

Optionally, in an implementation of the second aspect, the determining at least one of information about sharing a local oscillator by a plurality of transceiver units, isolation between a plurality of channels used to carry phase tracking reference signals, and status information of the channels used to carry the phase tracking reference signals includes: determining, based on a status of sharing a local oscillator unit by the plurality of transceiver units, the information about sharing a local oscillator by the plurality of transceiver units.

Optionally, in an implementation of the second aspect, the determining, based on a status of sharing a local oscillator by the plurality of transceiver units, the information about sharing a local oscillator by the plurality of transceiver units includes: determining, based on a status of sharing a local oscillator by a plurality of inherent transceiver units in the terminal device, the information about sharing a local oscillator by the plurality of transceiver units.

Optionally, in an implementation of the second aspect, the determining, based on a status of sharing a local oscillator by the plurality of transceiver units, the information about sharing a local oscillator by the plurality of transceiver units includes: measuring phase noise errors based on phase tracking reference signals of the plurality of transceiver units; and determining, based on the measured phase noise errors of the plurality of transceiver units, the information about sharing a local oscillator by the plurality of transceiver units.

Optionally, in an implementation of the second aspect, the determining, based on the measured phase noise errors of the plurality of transceiver units, the information about sharing a local oscillator by the plurality of transceiver units includes: if the phase noise errors of the plurality of transceiver units are less than a first threshold, determining that the plurality of transceiver units share a local oscillator.

Optionally, in an implementation of the second aspect, the sending, to a network device, the at least one of the information about sharing a local oscillator by the plurality of transceiver units, the isolation between the plurality of channels used to carry the phase tracking reference signals, and the status information of the channels used to carry the phase tracking reference signals includes: sending, to the network device, a quantity of transceiver units driven by each local oscillator unit of the terminal device; or sending, to the network device, indication information that the plurality of transceiver units share a local oscillator.

Optionally, in an implementation of the second aspect, the determining at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: estimating, based on a second reference signal on each of the plurality of channels used to carry the phase tracking reference signals, the isolation between the plurality of channels used to carry the phase tracking reference signals; and sending, to the network device, the isolation between the channels corresponding to a plurality of second reference signals.

Optionally, in an implementation of the second aspect, the determining port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining status information of a channel used to carry the phase tracking reference signal.

Optionally, in an implementation of the second aspect, the port configuration information, requested by the terminal device, of the phase tracking reference signal is determined based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals; and the port configuration information, requested by the terminal device, of the phase tracking reference signal is sent to the network device.

Optionally, in an implementation of the second aspect, first information is sent to the network device, where the first information is used by the terminal device to request a resource from the network device, and the resource is used by the terminal device to send, to the network device, the port configuration information, requested by the terminal device, of the phase tracking reference signal.

Acknowledgment information sent by the network device for the first information is received, where the acknowledgment information is used to indicate the resource on which the terminal device sends the port configuration information, required by the terminal device, of the phase tracking reference signal.

Optionally, in an implementation of the second aspect, second information sent by the network device is received, where the second information is used to instruct the terminal device to feed back, to the network device, the port configuration information, requested by the terminal device, of the phase tracking reference signal.

Optionally, in an implementation of the second aspect, the terminal device receives third indication information sent by the network device, where the third indication information is used to indicate an effective time, sent by the network device to the terminal device, of the port configuration information of the phase tracking reference signal, and the effective time may be a period of time after the terminal device receives the port configuration information of the phase tracking reference signal, and the time may be expressed in slots and/or subframes and/or frames.

According to a third aspect, a wireless communication method is provided, including: determining, by a terminal device, at least one of information about sharing a local oscillator by a plurality of communications units, information about phase noise errors measured on a plurality of phase tracking reference signal ports, isolation between a plurality of channels used to carry phase tracking reference signals, and status information of the channels used to carry the phase tracking reference signals;

determining port configuration information, requested from a network device, of a phase tracking reference signal based on the at least one of the information about sharing a local oscillator by the plurality of communications units, the information about the phase noise errors measured on the plurality of phase tracking reference signal ports, the isolation between the plurality of channels used to carry the phase tracking reference signals, and the status information of the channels used to carry the phase tracking reference signals; and sending, the requested port configuration information of the phase tracking reference signal to the network device.

Optionally, in an implementation of the third aspect, after the sending the requested port configuration information of the phase tracking reference signal to the network device, the method further includes: receiving port configuration information, sent by the network device, of the phase tracking reference signal; and receiving, based on the port configuration information of the phase tracking reference signal, the phase tracking reference signal sent by the network device.

Optionally, in an implementation of the third aspect, the terminal device sends, to the network device by using an RRC report, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Optionally, in an implementation of the third aspect, the determining at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: determining, based on a status of sharing a local oscillator unit by the plurality of transceiver units, the information about sharing a local oscillator by the plurality of transceiver units.

Optionally, in an implementation of the third aspect, the determining, based on a status of sharing a local oscillator by the plurality of transceiver units, the information about sharing a local oscillator by the plurality of transceiver units includes: determining, based on a status of sharing a local oscillator by a plurality of inherent transceiver units in the terminal device, the information about sharing a local oscillator by the plurality of transceiver units.

Optionally, in an implementation of the third aspect, the determining, based on a status of sharing a local oscillator by the plurality of transceiver units, the information about sharing a local oscillator by the plurality of transceiver units includes: measuring phase noise errors based on phase tracking reference signals of the plurality of transceiver units; and determining, based on the measured phase noise errors of the plurality of transceiver units, the information about sharing a local oscillator by the plurality of transceiver units.

Optionally, in an implementation of the third aspect, the determining, based on the measured phase noise errors of the plurality of transceiver units, the information about sharing a local oscillator by the plurality of transceiver units includes: if the phase noise errors of the plurality of transceiver units are less than a first threshold, determining that the plurality of transceiver units share a local oscillator.

Optionally, in an implementation of the third aspect, determining a quantity of phase tracking reference signal ports based on the information about sharing a local oscillator by the plurality of transceiver units includes: if the plurality of transceiver units share a local oscillator, determining that there is one phase tracking reference signal port for the plurality of transceiver units.

Optionally, in an implementation of the third aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data.

Optionally, in an implementation of the third aspect, the determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data includes:

estimating, based on a second reference signal on each of the plurality of channels used to carry the phase tracking reference signals, the isolation between the plurality of channels used to carry the phase tracking reference signals; and determining, based on the estimated isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

Optionally, in an implementation of the third aspect, the determining, based on the estimated isolation between the plurality of channels used to carry the phase tracking reference signals, the orthogonal multiplexing manner applied to the plurality of ports that are configured to send the phase tracking reference signals includes: when the isolation between the plurality of channels used to carry the phase tracking reference signals meets a preset condition, applying non-orthogonal multiplexing to the plurality of ports of the phase tracking reference signals or applying non-orthogonal multiplexing to the phase tracking reference signal and data.

Optionally, in an implementation of the third aspect, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the status information of the channels used to carry the phase tracking reference signals, a mapping relationship between the phase tracking reference signal and a second reference signal.

Optionally, in an implementation of the third aspect, the second reference signal is a demodulation reference signal.

Optionally, in an implementation of the third aspect, first information is sent to the network device, where the first information is used by the terminal device to request a resource from the network device, and the resource is used by the terminal device to send, to the network device, the port configuration information, requested by the terminal device, of the phase tracking reference signal.

Acknowledgment information sent by the network device for the first information is received, where the acknowledgment information is used to indicate the resource on which the terminal device sends the port configuration information, required by the terminal device, of the phase tracking reference signal.

Optionally, in an implementation of the third aspect, second information sent by the network device is received, where the second information is used to instruct the terminal device to feed back, to the network device, the port configuration information, requested by the terminal device, of the phase tracking reference signal.

According to a fourth aspect, a network device is provided, including an obtaining module, a determining module, and a sending module. The network device may be configured to perform the method according to any one of the first aspect or the possible implementations of the first aspect.

According to a fifth aspect, a terminal device is provided, including a determining module and a sending module. The terminal device may be configured to perform the method according to any one of the second aspect or the possible implementations of the second aspect.

According to a sixth aspect, a terminal device is provided, including a determining module and a sending module. The terminal device may be configured to perform the method according to any one of the third aspect or the possible implementations of the third aspect.

According to a seventh aspect, a network device is provided, including a memory, a transceiver, and a processor, where the memory stores program code that may be used to instruct to perform any one of the first aspect or the optional implementations of the first aspect, and the transceiver is specifically configured to receive and send signals under driving of the processor. When the code is executed, the processor may implement operations performed by the network device in the method.

According to an eighth aspect, a terminal device is provided, including a memory, a transceiver, and a processor, where the memory stores program code that may be used to instruct to perform any one of the second aspect or the optional implementations of the second aspect, and the transceiver is specifically configured to receive and send signals under driving of the processor. When the code is executed, the processor may implement operations performed by the terminal device in the method.

According to a ninth aspect, a terminal device is provided, including a memory, a transceiver, and a processor, where the memory stores program code that may be used to instruct to perform any one of third aspect or the optional implementations of the third aspect, and the transceiver is specifically configured to receive and send signals under driving of the processor. When the code is executed, the processor may implement operations performed by the terminal device in the method.

According to a tenth aspect, a computer readable medium is provided and configured to store a computer program, where the computer program includes instructions used to perform the method according to any one of the first aspect or the possible implementations of the first aspect, the method according to any one of the second aspect or the possible implementations of the second aspect, or the method according to any one of the third aspect or the possible implementations of the third aspect.

DESCRIPTION OF EMBODIMENTS

The following describes technical solutions in this application with reference to the accompanying drawings.

Figure 1:
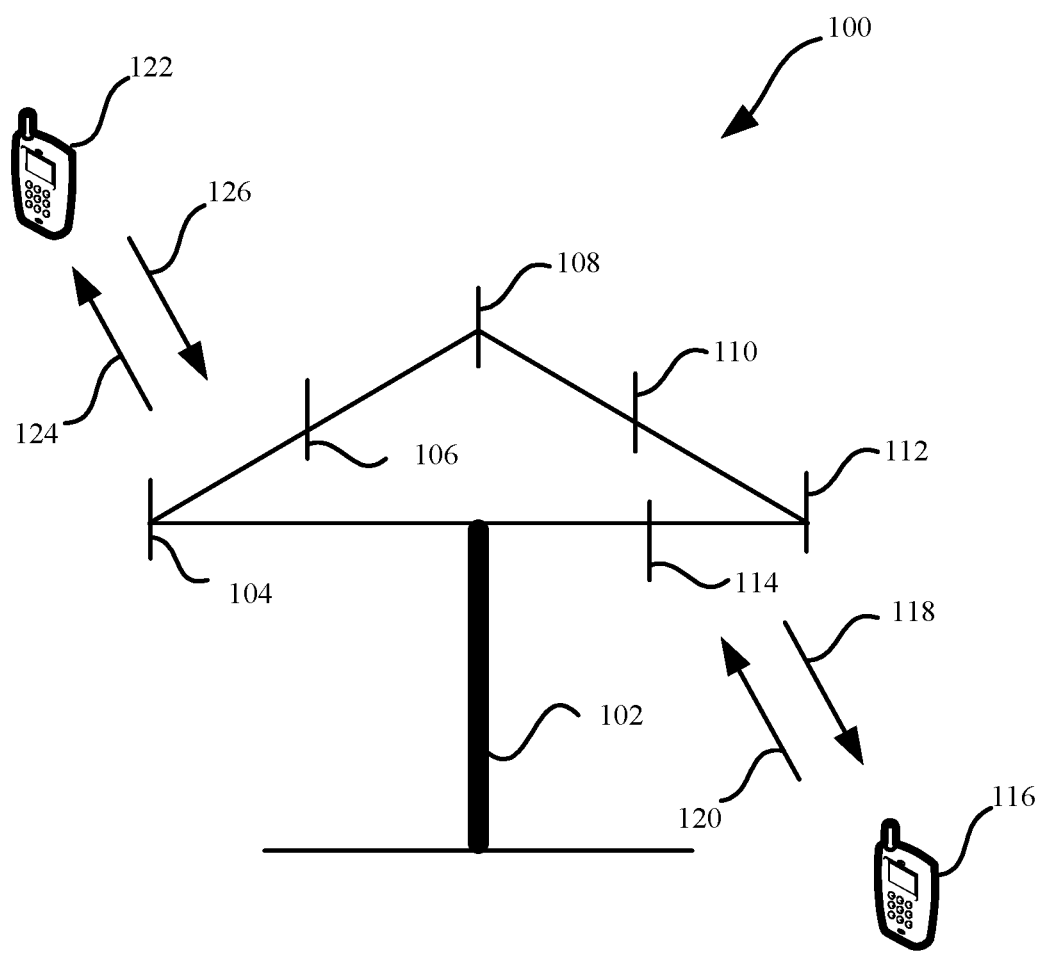
FIG. 1 is a scenario diagram of a communications system of a wireless communication method, a network device, and a terminal device according to this application.

FIG. 1 is a schematic diagram of a communications system 100 according to this application. As shown in FIG. 1, the communications system 100 includes a network device 102. The network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices similar to the terminal device 116 or 122.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124 and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex (FD) system, the forward link 118 and the reverse link 120 may use a same frequency band, and the forward link 124 and the reverse link 126 may use a same frequency band.

Each antenna (or an antenna group including a plurality of antennas) and/or area that is designed for communication is referred to as a sector of the network device 102. For example, the antenna group may be designed to communicate with a terminal device in a sector of coverage of the network device 102. In a process in which the network device 102 separately communicates with the terminal devices 116 and 122 by using the forward links 118 and 124, a transmit antenna of the network device 102 may improve signal-to-noise ratios of the forward links 118 and 124 through beamforming. In addition, compared with a manner in which a network device sends signals to all terminal devices within coverage of the network device by using a single antenna, when the network device 102 sends, through beamforming, signals to the terminal devices 116 and 122 that are randomly distributed within related coverage, less interference is caused to a mobile device in a neighboring cell.

Within a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a public land mobile network (PLMN), or another network. FIG. 1 is a simplified schematic diagram of an example. The system may further include other network devices that are not shown in FIG. 1.

Optionally, in this embodiment of this application, the network device may be a device, for example, a base station or a base station controller, that communicates with a terminal device. Each network device may provide communication coverage for a specific geographic area, and can communicate with a terminal device (for example, a user equipment (UE)) located within the coverage (a cell). The network device may support communication protocols of different standards, or may support different communication modes. For example, the network device may be a base transceiver station (BTS) in a GSM or a CDMA system, may be a NodeB (NB) in a WCDMA system, or may be an evolved NodeB (Evolutional NodeB, eNB, or eNodeB) in an LTE system, or a radio controller in a cloud radio access network (CRAN). Alternatively, the network device may be a network device in a future 5G network, for example, a gNB, a small cell, a micro cell, or a transmission reception point (TRP), or may be a relay station, an access point, a network device in a future evolved public land mobile network (PLMN), or the like.

Optionally, in this embodiment of this application, the terminal device may be an access terminal, a user equipment (UE), a subscriber unit, a subscriber station, a mobile station, a mobile console, a remote station, a remote terminal, a mobile terminal, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, a terminal device in internet of things, a virtual reality device, a terminal device in a future 5G network, a terminal device in a future evolved public land mobile network (PLMN), or the like.

The wireless communication method and the device provided in the embodiments of this application can be applied to a terminal device, and the terminal device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, for example, the Linux operating system, the UNIX operating system, the Android operating system, the iOS operating system, or the Windows operating system. The application layer includes applications such as a browser, a contact list, word processing software, and instant messaging software.

In addition, various aspects or features of this application may be implemented as a method, an apparatus, or a product that uses standard programming and/or engineering technologies. The term "product" used in this application covers a computer program that may be accessed from any computer readable component, carrier, or medium. For example, the computer-readable medium may include but is not limited to a magnetic storage device (for example, a hard disk, a floppy disk, or a magnetic tape), an optical disc (for example, a compact disc (CD), or a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are used to store information. The term "machine-readable media" may include but is not limited to various media that can store, contain and/or carry an instruction and/or data.

To better understand this application, the following describes this application with reference to FIG. 2 to FIG. 7 by using a system same as or similar to the system shown in FIG. 1 as an example.

Figure 2:
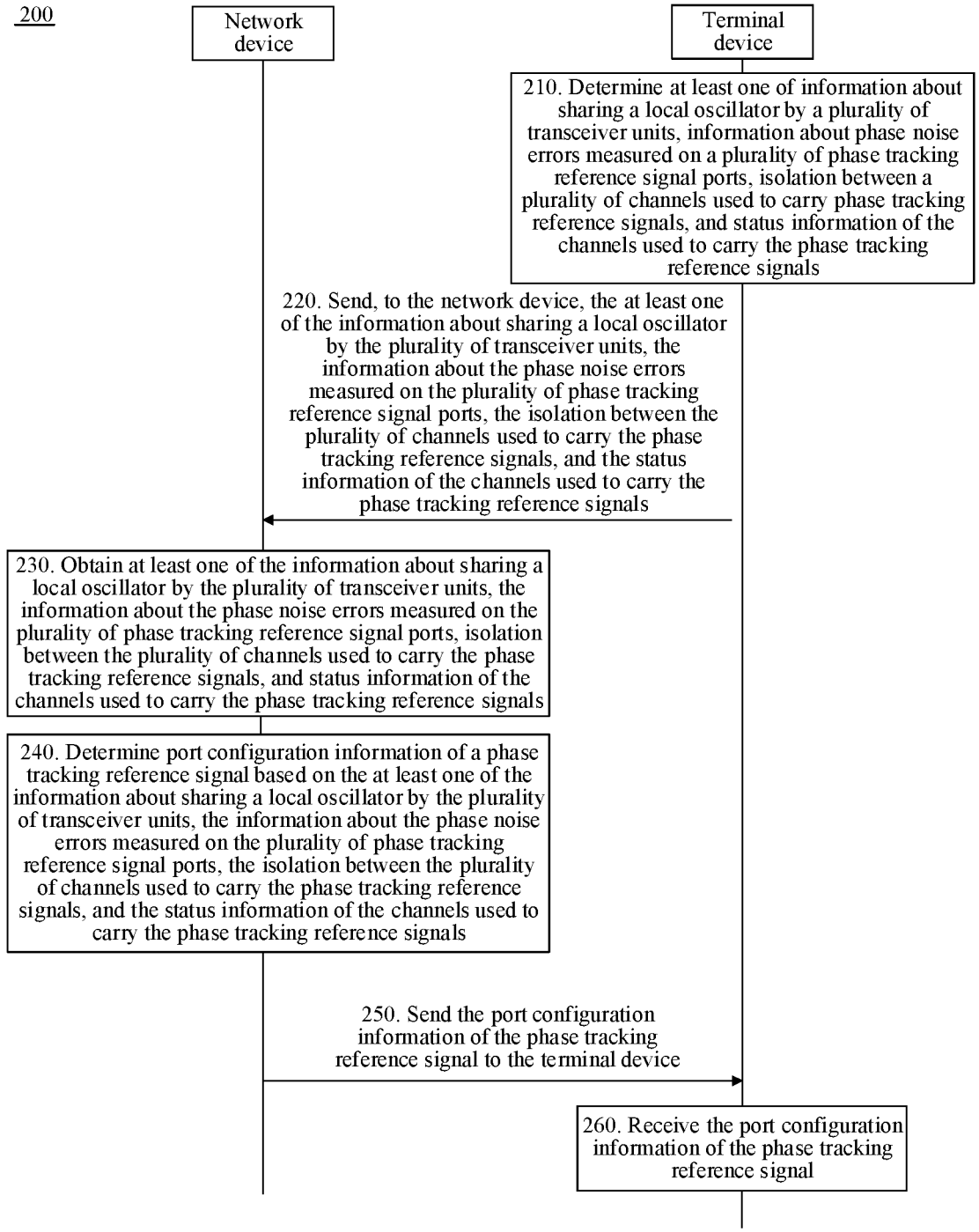
FIG. 2 is a schematic flowchart of a wireless communication method according to this application.

FIG. 2 is a schematic flowchart of a wireless communication method 200 according to this application. As shown in FIG. 2, the method 200 includes the following content.

In process 210, a terminal device determines at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals.

Optionally, that a terminal device determines at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: determining, based on a status of sharing a local oscillator unit by the plurality of transceiver units, the information about sharing a local oscillator by the plurality of transceiver units.

Specifically, the transceiver units (TxRU) are hardware components of the terminal device, and include an analog-to-digital converter, a local oscillator, a frequency mixer, a filter, a power amplifier, and the like. The transceiver units include a plurality of receiving units or a plurality of sending units. The status of sharing a local oscillator by the transceiver units means a status of sharing a local oscillator by the plurality of receiving units or a status of sharing a local oscillator by the plurality of sending units.

Optionally, the determining, based on a status of sharing a local oscillator by the plurality of transceiver units, the information about sharing a local oscillator by the plurality of transceiver units includes: determining, based on a status of sharing a local oscillator by a plurality of inherent transceiver units in the terminal device, the information about sharing a local oscillator by the plurality of transceiver units.

Specifically, determining the status of sharing a local oscillator by the transceiver units may be an inherent capability of the terminal device, and the status of sharing a local oscillator by the transceiver units is determined during manufacturing of the terminal device.

This application provides at least one of the following methods to help implement mapping between a PTRS and a DMRS:

The terminal device indicates, based on a capability of the terminal device, whether receiving/sending units of the terminal device share a local oscillator.

Alternatively, the terminal device reports whether phase noise errors measured by the terminal device on PTRS ports are the same.

Optionally, sending, to a network device, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: sending, to the network device, a quantity of transceiver units driven by each local oscillator unit of the terminal device; or sending, to the network device, indication information that the plurality of transceiver units share a local oscillator.

Specifically, the terminal device sends, to the network device, the quantity of transceiver units driven by each local oscillator unit of the terminal device. For example, the terminal device has four receiving units that are respectively a receiving unit 1, a receiving unit 2, a receiving unit 3, and a receiving unit 4. If the terminal device sends numbers 1 and 3 to the network device, it indicates that the receiving unit 2, the receiving unit 3, and the receiving unit 4 share a local oscillator.

The terminal device may further indicate, by using the indication information, the status of sharing a local oscillator by the plurality of transceiver units, as shown in Table 1.

TABLE 1

| Status of sharing a local oscillator by transceiver units | | | | |
|---|---|---|---|---|
| TxRU | #1 | #2 | #3 | #4 |
| #1 | 1 | 1 | 0 | 0 |
| #2 | 1 | 1 | 0 | 0 |
| #3 | 0 | 0 | 1 | 1 |
| #4 | 0 | 0 | 1 | 1 |

It can be learned from Table 1 that four receiving units of the transceiver units are respectively a receiving unit 1, a receiving unit 2, a receiving unit 3, and a receiving unit 4, where a number 1 in the table indicates that a local oscillator unit is shared, and a number 0 indicates that a local oscillator unit is not shared. It can be learned from the table that the receiving unit 1 and the receiving unit 2 share a local oscillator, and the receiving unit 3 and the receiving unit 4 share a local oscillator.

It should be understood that the indication information that a local oscillator is shared can be represented in another manner. The two manners listed in this application are merely examples, and are not limited thereto.

Optionally, the determining at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: estimating, on a downlink channel based on a second reference signal on each of the plurality of channels used to carry the phase tracking reference signals, the isolation between the plurality of channels used to carry the phase tracking reference signals.

Optionally, the determining at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: determining, based on a second reference signal of each of the plurality of channels used to carry the phase tracking reference signals, the isolation between the plurality of channels used to carry the phase tracking reference signals; and sending, to the network device, the isolation between the channels corresponding to a plurality of second reference signals.

Optionally, the second reference signal is a demodulation reference signal and/or a channel state information-reference signal (CSI-RS) and/or a mobility reference signal (MRS) and/or a beam reference signal (BRS) and/or a beam refinement reference signal (BRRS) and/or a beam management reference signal (BMRS).

Optionally, port configuration information, requested by the terminal device, of a phase tracking reference signal is determined based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals; and the port configuration information, requested by the terminal device, of the phase tracking reference signal is sent to the network device.

In process 220, the terminal device sends, to the network device, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Optionally, after accessing the network device, the terminal device demodulates data based on a default configuration, and feeds back, on a feasible uplink resource, the information about sharing a local oscillator by the plurality of transceiver units.

Specifically, after accessing the network device, the terminal device demodulates the data based on the default configuration, and feeds back, on an uplink resource such as a random access signal or an uplink reference signal, the information about sharing a local oscillator by the plurality of transceiver units.

Optionally, if no default configuration is specified by the network device, when accessing the network device, the terminal device sends the information about sharing a local oscillator of the terminal device, where the information about sharing a local oscillator is used by the network device to determine port configuration information of the PTRS.

Optionally, first information is sent to the network device, where the first information is used by the terminal device to request a resource from the network device, and the resource is used by the terminal device to send, to the network device, the port configuration information, requested by the terminal device, of the phase tracking reference signal; and acknowledgment information sent by the network device for the first information is received, where the acknowledgment information is used to indicate the resource on which the terminal device sends the port configuration information, required by the terminal device, of the phase tracking reference signal.

Optionally, second information sent by the network device is received, where the second information is used to instruct the terminal device to feed back, to the network device, the port configuration information, requested by the terminal device, of the phase tracking reference signal.

In process 230, the network device obtains at least one of the information about sharing a local oscillator by the plurality of transceiver units of the terminal device, isolation between the plurality of channels used to carry the phase tracking reference signals, and status information of the channels used to carry the phase tracking reference signals.

Optionally, that the network device obtains at least one of the information that is about sharing a local oscillator by the plurality of transceiver units and that is sent by the terminal device, the information that is about the phase noise errors measured on the plurality of phase tracking reference signal ports and that is sent by the terminal device, isolation between the plurality of channels used to carry the phase tracking reference signals, and status information of the channels used to carry the phase tracking reference signals includes: The network device receives the at least one of the information that is about sharing a local oscillator by the plurality of transceiver units and that is sent by the terminal device, the isolation between the plurality of channels used to carry the phase tracking reference signals, and the status information of the channels used to carry the phase tracking reference signals.

Optionally, determining port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining a quantity of phase tracking reference signal ports based on the information about the phase noise errors measured on the plurality of phase tracking reference signal ports.

Optionally, the determining a quantity of phase tracking reference signal ports based on the information about the phase noise errors measured on the plurality of phase tracking reference signal ports includes: if values of the phase noise errors measured on the plurality of phase tracking reference signal ports are less than a first threshold, determining that there is one phase tracking reference signal port.

Optionally, that the network device obtains at least one of the information about sharing a local oscillator by the plurality of transceiver units of the terminal device, the information about the phase noise errors measured on the plurality of phase tracking reference signal ports, isolation between the plurality of channels used to carry the phase tracking reference signals, and status information of the channels used to carry the phase tracking reference signals includes: The network device receives the information that is about sharing a local oscillator by the plurality of transceiver units and that is sent by the terminal device, and the network device determines, on a network device side, the isolation between the plurality of channels used to carry the phase tracking reference signals, and the status information of the channels used to carry the phase tracking reference signals.

Optionally, when the network device estimates isolation between a plurality of downlink channels used to carry phase tracking reference signals, the network device estimates the isolation between the plurality of downlink channels based on first reference signals on a plurality of uplink channels.

Optionally, the first reference signal is one or more of the following reference signals: a sounding reference signal (SRS), and a demodulation reference signal (DMRS).

Optionally, determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data includes: estimating, based on a second reference signal on each of the plurality of channels used to carry the phase tracking reference signals, the isolation between the plurality of channels used to carry the phase tracking reference signals; and determining, based on the estimated isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

Optionally, the determining, based on the estimated isolation between the plurality of channels used to carry the phase tracking reference signals, the orthogonal multiplexing manner applied to the plurality of ports that are configured to send the phase tracking reference signals includes: when the isolation between the plurality of channels used to carry the phase tracking reference signals meets a preset condition, applying non-orthogonal multiplexing to the plurality of ports of the phase tracking reference signals or applying non-orthogonal multiplexing to the phase tracking reference signal and data.

Optionally, the network device receives isolation, sent by the terminal device, of the plurality of downlink channels used to carry the phase tracking reference signals, where the terminal device estimates, based on the second reference signal on each of the plurality of channels used to carry the phase tracking reference signals, the isolation between the plurality of channels used to carry the phase tracking reference signals.

In process 240, the network device determines the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Optionally, after the terminal device accesses the network device, the network device sends data based on a default PTRS configuration.

Optionally, that the network device determines the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining a quantity of phase tracking reference signal ports based on the information about sharing a local oscillator by the plurality of transceiver units.

Optionally, the determining a quantity of phase tracking reference signal ports based on the information about sharing a local oscillator by the plurality of transceiver units includes: if the plurality of transceiver units share a local oscillator, determining that there is one phase tracking reference signal port for the plurality of transceiver units.

Optionally, that the network device determines the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes:

determining a quantity of phase tracking reference signal ports based on the information about the phase noise errors measured on the plurality of phase tracking reference signal ports.

Optionally, the determining a quantity of phase tracking reference signal ports based on the information about the phase noise errors measured on the plurality of phase tracking reference signal ports includes: if the values of the phase noise errors measured on the plurality of phase tracking reference signal ports are less than the first threshold, determining that there is one phase tracking reference signal port.

Optionally, the determining the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

Optionally, the determining, based on the isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data includes: estimating, based on a first reference signal on each of the plurality of channels used to carry the phase tracking reference signals, the isolation between the plurality of channels used to carry the phase tracking reference signals; and determining, based on the estimated isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

For example, in a 2*2 single-user MIMO mode, a network device sends a first reference signal 1 and a first reference signal 2 on two channels respectively. When isolation between the channels is relatively good, a terminal device receives the first reference signal 1 and the first reference signal 2 on the corresponding channels respectively. However, if the isolation between the channels is poor, the terminal device receives the first reference signal 2 on a channel on which the first reference signal 1 is expected to be received or receives the first reference signal 1 on a channel on which the first reference signal 2 is expected to be received. This indicates that interference exists between the channels. Isolation between channels may be determined based on first reference signals on the channels. If the isolation between the channels meets a preset condition, non-orthogonal multiplexing is applied to a PTRS port and a DMRS port.

Optionally, the determining, based on the estimated isolation between the plurality of channels used to carry the phase tracking reference signals, the orthogonal multiplexing manner applied to the plurality of ports that are configured to send the phase tracking reference signals includes: when the isolation between the plurality of channels used to carry the phase tracking reference signals meets the preset condition, applying non-orthogonal multiplexing to the plurality of ports of the phase tracking reference signals or applying non-orthogonal multiplexing to the phase tracking reference signal and data.

Figure 3:
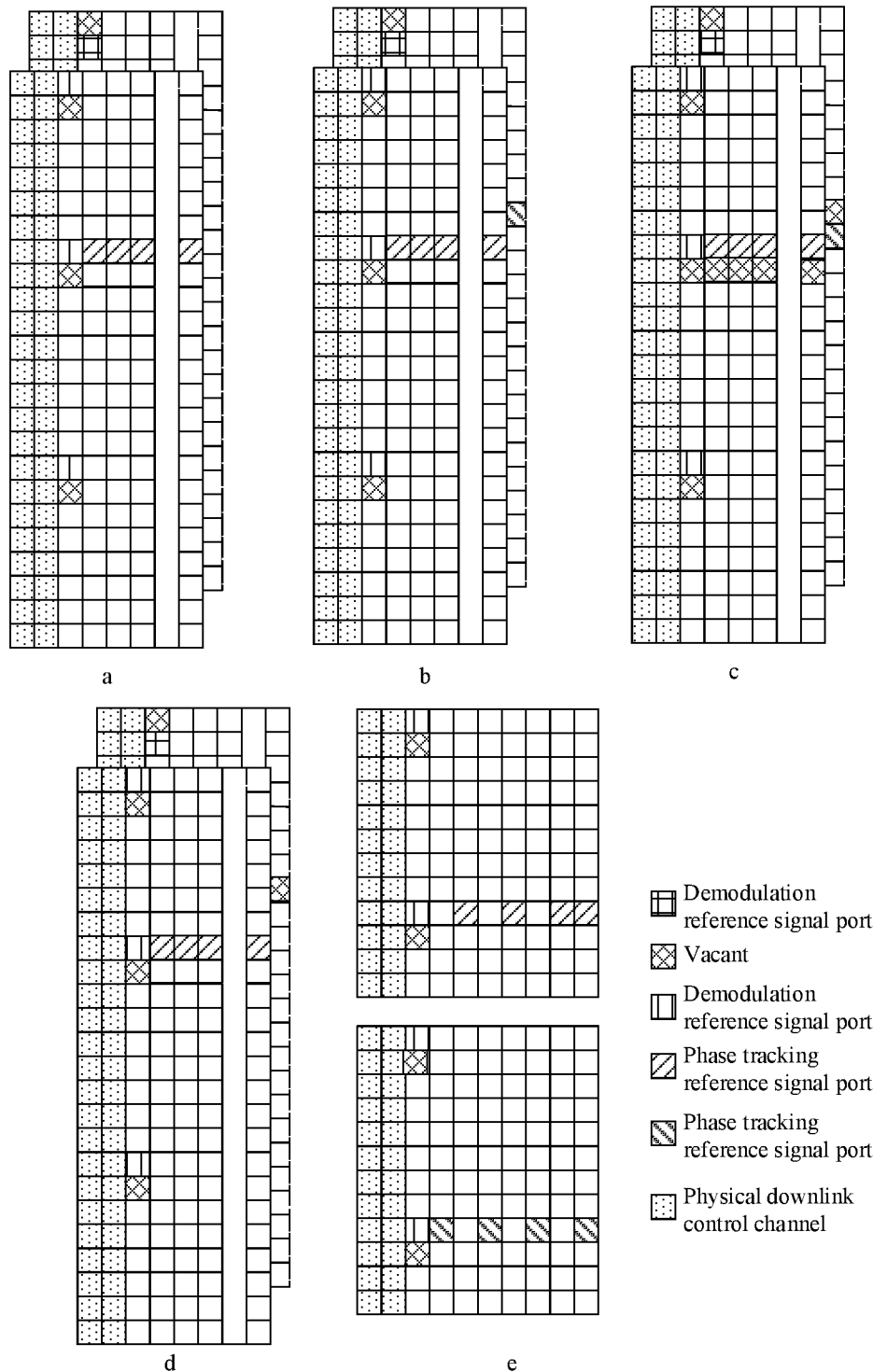
FIG. 3 is a schematic diagram of port configuration information of different PTRSs.

For example, FIG. 3 shows several configurations of phase tracking reference signal ports in a 2*2 single-user MIMO mode. Different configurations are applicable to different scenarios. A configuration c is the prior art and is a default configuration. To be specific, both a DMRS and a PTRS are configured at each transport layer, a quantity of DMRS ports is equal to a quantity of PTRS ports, and orthogonality is applied to the DMRS port and the PTRS port.

In the 2*2 single-user MIMO mode, there are two receiving units and two sending units. The two receiving units are used as an example. If the two receiving units share a local oscillator, it indicates that phase noise errors of the two receiving units may be estimated based on one PTRS, and the PTRS is sent to the terminal device by using one port. In this case, a quantity of PTRS ports is reduced, so that a resource block used to transmit a PTRS at a transport layer can be used to transmit data. As shown in a configuration a, there is one PTRS port, and non-orthogonality is applied to the PTRS port and data.

If the two receiving units do not share a local oscillator, it indicates that the two receiving units have different phase noise errors, and the phase noise errors of signals cannot be estimated based on one PTRS. Therefore, PTRSs are sent to the terminal device by using two ports. If isolation between channels for sending the PTRSs is relatively good and signals on the two channels do not interfere with each other, a non-orthogonal manner may be used on the PTRS ports. As shown in a configuration b, there are two PTRS ports, a quantity of PTRS ports is equal to a quantity of DMRS ports, and non-orthogonality is applied to the PTRS ports.

In a configuration d, there is one PTRS port, and orthogonality is applied to the PTRS port and data. In a configuration e, a quantity of PTRS ports is equal to that of DMRS ports, the PTRS ports are in a time division mode, and non-orthogonality is applied to the PTRS ports and data.

Optionally, the determining the port configuration information of the phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the status information of the channels used to carry the phase tracking reference signals, a mapping relationship between the phase tracking reference signal and a first reference signal.

Specifically, the network device may determine the mapping relationship between the phase tracking reference signal and the first reference signal based on the status information of the channels, such as a signal-to-noise ratio and channel quality. If signal-to-noise ratios of the channels are relatively high, a PTRS port may be mapped to a transport layer at which the first reference signal is transmitted.

Specifically, a mapping relationship between the DMRS port and the PTRS port may be indicated by using a quasi co-location (Quasi Co-Located, QCL) relationship. The QCL relationship or the mapping relationship may be represented in a format of Table 2 or Table 3.

The mapping relationship, for example, QCL, between the PTRS and the DMRS can be configured by using RRC signaling.

TABLE 2

Mapping relationship between a DMRS port and a PTRS port

| DMRS port | PTRS port |
|---|---|
| $N_1$ | $M_1$ |
| $N_2$ | NULL |

TABLE 2-continued

Mapping relationship between a DMRS port and a PTRS port

| DMRS port | PTRS port |
|---|---|
| $N_3$ | $M_2$ |
| $N_4$ | NULL |

TABLE 3

Mapping relationship between a DMRS port and a PTRS port

| DMRS port | PTRS port |
|---|---|
| $N_1$ | $M_1$ |
| $N_2$ | $M_1$ |
| $N_3$ | $M_2$ |
| $N_4$ | $M_2$ |

In each of Table 2 and Table 3, there are four DMRS ports and two PTRS ports, where the four DMRS ports are respectively N1, N2, N3, and N4, and the two PTRS ports are respectively mapped to layers at which the N1 port and the N3 port are located.

Optionally, because the channel status changes in real time, the port configuration information of the PTRS needs to be updated based on the channel status in a periodic or quasi-static manner or through triggering. The triggering may be initiated by the network device or the terminal device.

Optionally, the first reference signal is a demodulation reference signal.

Optionally, after the port configuration information of the phase tracking reference signal is sent to the terminal device, the method further includes:

sending the phase tracking reference signal to the terminal device based on the port configuration information of the phase tracking reference signal.

Optionally, the port configuration information of the phase tracking reference signal is determined based on the at least one of the port configuration information, requested by the terminal device, of the phase tracking reference signal, the isolation, estimated on a network side, of the plurality of channels used to carry the phase tracking reference signals, and the status information of the channels used to carry the phase tracking reference signals.

Optionally, when the port configuration information that is of the phase tracking reference signal and that is determined based on the isolation between the plurality of channels used to carry the phase tracking reference signals or the status information of the channels used to carry the phase tracking reference signals is the same as the port configuration information, requested by the terminal device, of the phase tracking reference signal, acknowledgment information is sent to the terminal device.

Alternatively, when the port configuration information that is of the phase tracking reference signal and that is determined based on the isolation between the plurality of channels used to carry the phase tracking reference signals or the status information of the channels used to carry the phase tracking reference signals is different from the port configuration information, requested by the terminal device, of the phase tracking reference signal, the port configuration information, determined by the network device, of the phase tracking reference signal is sent to the terminal device.

Optionally, before the port configuration information, requested by the terminal device, of the phase tracking reference signal, the isolation between the plurality of channels used to carry the phase tracking reference signals, or the status information of the channels used to carry the phase tracking reference signals is obtained, the method further includes: receiving the first information sent by the terminal device, where the first information is used by the terminal device to request the resource from the network device, and the resource is used by the terminal device to send, to the network device, the port configuration information, requested by the terminal device, of the phase tracking reference signal; and sending the acknowledgment information to the terminal device for the first information, where the acknowledgment information is used to indicate the resource on which the terminal device sends the port configuration information, required by the terminal device, of the phase tracking reference signal.

Optionally, before the port configuration information, requested by the terminal device, of the phase tracking reference signal, the isolation between the plurality of channels used to carry the phase tracking reference signals, or the status information of the channels used to carry the phase tracking reference signals is obtained, the method further includes: sending the second information to the terminal device, where the second information is used to instruct the terminal device to feed back, to the network device, the port configuration information, requested by the terminal device, of the phase tracking reference signal.

Optionally, the network device sends third indication information to the terminal device, where the third indication information is used to indicate an effective time, sent by the network device to the terminal device, of the port configuration information of the phase tracking reference signal, and the effective time may be a period of time after the terminal device receives the port configuration information of the phase tracking reference signal, and the time may be expressed in slots and/or subframes and/or frames.

Optionally, when the quantity of ports for sending the phase tracking reference signals is less than a quantity of ports for sending first reference signals, and non-orthogonal multiplexing is applied to the phase tracking reference signal and data, quantities of valid resource elements used to transmit data are different at a plurality of transport layers, and the method further includes: when one transport block is mapped to a plurality of transport layers, matching a corresponding quantity of bits for each code block, where a quantity of code blocks is obtained by dividing the transport block based on a predetermined value; obtaining a quantity of quadrature amplitude modulation symbols of each code block; and performing, at the plurality of transport layers, layer mapping on the quadrature amplitude modulation symbols of the transport block.

Optionally, there is one port for the phase tracking reference signal and one port for the first reference signal at each of the plurality of transport layers. When the quantity of ports for sending the phase tracking reference signals is less than the quantity of ports for sending the first reference signals, and non-orthogonal multiplexing is applied to the phase tracking reference signal and data, quantities of resource elements occupied by the phase tracking reference signal are different at each of the plurality of transport layers. Therefore, quantities of valid resource elements used to transmit data are different at each of the plurality of transport layers. The method further includes: determining, in rate matching, a quantity of bits of each code block obtained after encoding; and performing layer mapping.

When one transport block is mapped to a plurality of transport layers, a corresponding quantity of bits is matched for each code block, and a quantity of code blocks is obtained by dividing the transport block based on a predetermined value, and is determined by using Formula (1) and Formula (2).

$$G' = \frac{G}{N_L Q_m} = kC + R_I + R_P \quad (1)$$

Herein, G represents a total quantity of bits available for a current transport block, and G' represents a total quantity of resource elements on average at each layer. When a transmit diversity technology is used, $N_L=2$. Otherwise, $N_L$ represents a quantity of layers to which the current transport block is mapped, C represents a quantity of code blocks obtained by dividing the current transport block, $Q_m$ represent a modulation order, and $R_I$ and $R_p$ respectively represent an integer part and a fractional part of a result of G' mod C.

$$E_i = \begin{cases} k \cdot N_L \cdot Q_m & i \le C - R_i \\ (k+1) \cdot N_L \cdot Q_m & C - R_I < i < C - 1 \\ (k+1+R_P) \cdot N_L \cdot Q_m & i = C \end{cases} \quad (2)$$

Herein, $E_i$ represents a quantity of transmitted bits corresponding to each code block.

The layer mapping means to perform, at the plurality of transport layers, layer mapping on the quadrature amplitude modulation symbols of the transport block based on a quantity of quadrature amplitude modulation symbols of each code block. Layer mapping is performed on the quadrature amplitude modulation symbols of the transport block for the plurality of transport layers according to Formula (3) and Formula (4):

$$\sum_{i=0}^{N_L} M_{symb}^{Layer(i)} = M_{symb}^{(k)} \quad (3)$$

$$\frac{M_{symb}^{Layer(0)}}{N_{RE}^0} = \frac{M_{symb}^{Layer(1)}}{N_{RE}^1} \dots \frac{M_{symb}^{Layer(N_L)}}{N_{RE}^{N_L}} = 1 \quad (4)$$

Herein, $M_{symb}^{(k)}$ represents a quantity of quadrature amplitude modulation symbols of a $k^{th}$ transport block, $M_{symb}^{Layer(i)}$ represents a quantity of quadrature amplitude modulation symbols mapped by the $k^{th}$ transport block at a layer i, and $N_{RE}^i$ represents a quantity of valid resource elements at the layer i.

In process 250, the network device sends the port configuration information of the phase tracking reference signal to the terminal device.

Optionally, the port configuration information of the phase tracking reference signal may be configured by the network device for the terminal device by using RRC signaling.

In process 260, the terminal device receives the port configuration information, sent by the network device, of the phase tracking reference signal.

Optionally, the terminal device receives, based on the port configuration information of the phase tracking reference signal, the phase tracking reference signal sent by the network device.

Therefore, in this application, the network device determines, based on the information about sharing a local oscillator by the plurality of transceiver units of the terminal device, the quantity of ports for sending the PTRSs; determines, based on the isolation between the plurality of channels used to carry the phase tracking reference signals, an orthogonal multiplexing manner applied to the PTRS ports and the DMRS ports or a multiplexing manner applied to the PTRS ports and data; and determines a transport layer of the PTRS based on the status information of the channels used to carry the phase tracking reference signals, so that the port configuration information of the PTRS is determined. In this way, a PTRS port is flexibly configured, and a quantity of ports for sending PTRSs can be reduced. Therefore, a quantity of subcarriers occupied by the PTRSs is reduced, and resource overheads are reduced.

Figure 4:
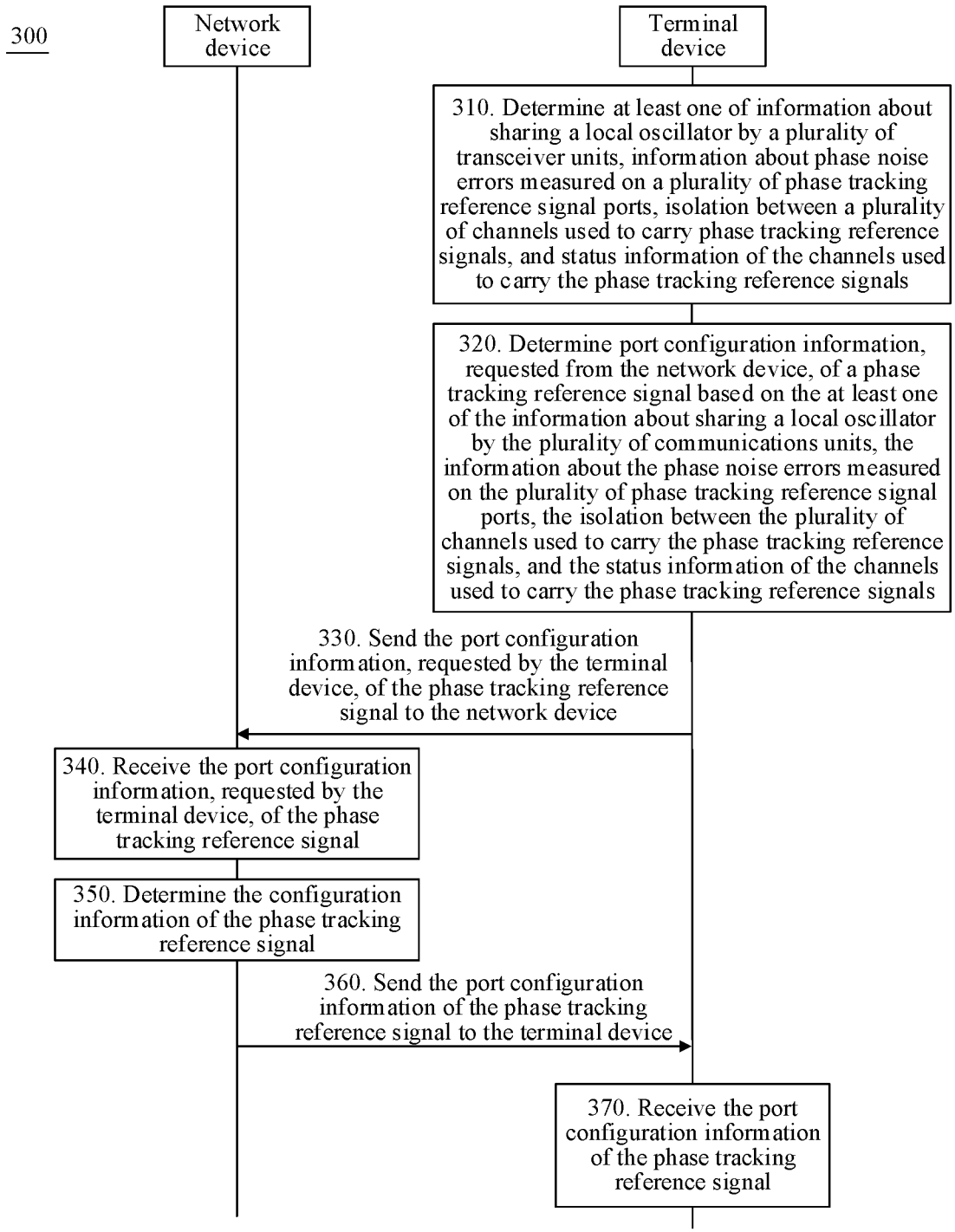
FIG. 4 is a schematic flowchart of a wireless communication method according to this application.

FIG. 4 is a schematic flowchart of a wireless communication method 300 according to this application. As shown in FIG. 4, the method 300 includes the following content.

In process 310, a terminal device determines at least one of information about sharing a local oscillator by a plurality of communications units, information about phase noise errors measured on a plurality of phase tracking reference signal ports, isolation between a plurality of channels used to carry phase tracking reference signals, and status information of the channels used to carry the phase tracking reference signals.

Optionally, the determining at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals includes: determining, based on a status of sharing a local oscillator unit by the plurality of transceiver units, the information about sharing a local oscillator by the plurality of transceiver units.

Optionally, the determining, based on a status of sharing a local oscillator by the plurality of transceiver units, the information about sharing a local oscillator by the plurality of transceiver units includes: determining, based on a status of sharing a local oscillator by a plurality of inherent transceiver units in the terminal device, the information about sharing a local oscillator by the plurality of transceiver units.

Optionally, determining a quantity of phase tracking reference signal ports based on the information about sharing a local oscillator by the plurality of transceiver units includes: if the plurality of transceiver units share a local oscillator, determining that there is one phase tracking reference signal port for the plurality of transceiver units.

In process 320, the terminal device determines port configuration information, requested from a network device, of a phase tracking reference signal based on the at least one of the information about sharing a local oscillator by the plurality of communications units, the information about the phase noise errors measured on the plurality of phase tracking reference signal ports, the isolation between the plurality of channels used to carry the phase tracking reference signals, and the status information of the channels used to carry the phase tracking reference signals.

Optionally, the determining a quantity of phase tracking reference signal ports based on the information about sharing a local oscillator by the plurality of transceiver units includes: if the plurality of transceiver units share a local oscillator, determining that there is one phase tracking reference signal port for the plurality of transceiver units.

Optionally, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data.

Optionally, the determining, based on the isolation between the plurality of channels used to carry the phase tracking reference signals, an orthogonal multiplexing manner applied to the plurality of ports that are configured to send the phase tracking reference signals or an orthogonal multiplexing manner applied to the phase tracking reference signal and data includes:

estimating, based on a first reference signal on each of the plurality of channels used to carry the phase tracking reference signals, the isolation between the plurality of channels used to carry the phase tracking reference signals; and determining, based on the estimated isolation between the plurality of channels used to carry the phase tracking reference signals, the orthogonal multiplexing manner applied to the plurality of ports that are configured to send the phase tracking reference signals or the orthogonal multiplexing manner applied to the phase tracking reference signal and data.

Optionally, the determining, based on the estimated isolation between the plurality of channels used to carry the phase tracking reference signals, the orthogonal multiplexing manner applied to the plurality of ports that are configured to send the phase tracking reference signals includes: when the isolation between the plurality of channels used to carry the phase tracking reference signals meets a preset condition, applying non-orthogonal multiplexing to the plurality of ports of the phase tracking reference signals or applying non-orthogonal multiplexing to the phase tracking reference signal and data.

Optionally, the determining port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals includes: determining, based on the status information of the channels used to carry the phase tracking reference signals, a mapping relationship between the phase tracking reference signal and a first reference signal.

Optionally, the first reference signal is a demodulation reference signal.

In process 330, the terminal device sends the requested port configuration information of the phase tracking reference signal to the network device.

Optionally, first information is sent to the network device, where the first information is used by the terminal device to request a resource from the network device, and the resource is used by the terminal device to send, to the network device, the port configuration information, requested by the terminal device, of the phase tracking reference signal.

Acknowledgment information sent by the network device for the first information is received, where the acknowledgment information is used to indicate the resource on which the terminal device sends the port configuration information, required by the terminal device, of the phase tracking reference signal.

Optionally, second information sent by the network device is received, where the second information is used to instruct the terminal device to feed back, to the network device, the port configuration information, requested by the terminal device, of the phase tracking reference signal.

In process 340, the network device receives the requested port configuration information, sent by the terminal device, of the phase tracking reference signal.

In process 350, the network device determines port configuration information of the phase tracking reference signal.

Optionally, the network device determines, based on at least one of isolation between the plurality of channels used to carry the phase tracking reference signals, and status information of the channels used to carry the phase tracking reference signals, whether to accept the port configuration information, requested by the terminal device, of the phase tracking reference signal, where the isolation and the status information are obtained on a network side.

Specifically, if the isolation, obtained by the network device, between the plurality of channels used to carry the phase tracking reference signals and the status information, obtained by the network device, of the channels used to carry the phase tracking reference signals are consistent with the port configuration information requested by the terminal device, the network device accepts the port configuration information, requested by the terminal device, of the phase tracking reference signal. Otherwise, the port configuration information, requested by the terminal device, of the phase tracking reference signal is corrected.

In process 360, the network device sends the port configuration information of the phase tracking reference signal to the terminal device.

Optionally, if the network device accepts the port configuration information, requested by the terminal device, of the phase tracking reference signal, the port configuration information, sent to the terminal device, of the phase tracking reference signal is acknowledgment information. If the network device rejects the port configuration information, requested by the terminal device, of the phase tracking reference signal, the network device sends the port configuration information, determined by the network device, of the phase tracking reference signal to the terminal device.

In process 370, the terminal device receives the port configuration information, sent by the network device, of the phase tracking reference signal.

Optionally, the phase tracking reference signal sent by the network device is received based on the port configuration information of the phase tracking reference signal.

Therefore, in this application, the terminal device determines, based on the information about sharing a local oscillator by the plurality of transceiver units, the quantity of ports for sending the PTRSs; determines, based on the isolation between the plurality of channels used to carry the phase tracking reference signals, an orthogonal multiplexing manner applied to the PTRS ports and DMRS ports or a multiplexing manner applied to the PTRS ports and data; and determines a transport layer of the PTRS based on the status information of the channels used to carry the phase tracking reference signals, so that the port configuration information of the PTRS is determined and the port configuration information of the phase tracking reference signal is sent to the network device. In this way, a PTRS port is flexibly configured, and a quantity of ports for sending PTRSs can be reduced. Therefore, a quantity of subcarriers occupied by the PTRSs is reduced, and resource overheads are reduced.

Figure 5:
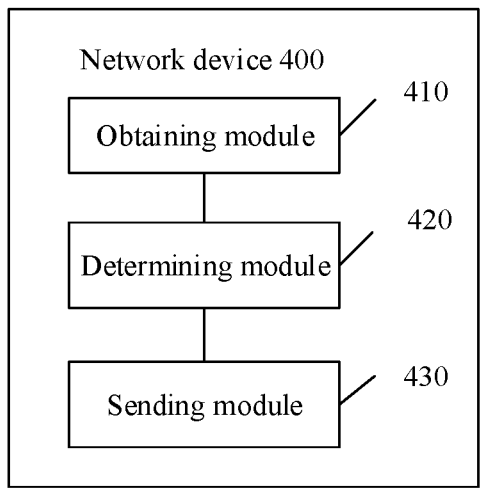
FIG. 5 is a schematic block diagram of a network device according to this application.

FIG. 5 is a schematic block diagram of a network device 400 according to this application. As shown in FIG. 5, the network device includes:

an obtaining module 410, configured to obtain at least one of information that is about sharing a local oscillator by a plurality of transceiver units and that is sent by a terminal device, information that is about phase noise errors measured on a plurality of phase tracking reference signal ports and that is sent by the terminal device, isolation between a plurality of channels used to carry phase tracking reference signals, and status information of the channels used to carry the phase tracking reference signals, where the information about sharing a local oscillator by the plurality of transceiver units is a status of sharing a local oscillator unit by the plurality of transceiver units, and the transceiver units include receiving units or sending units;

a determining module 420, configured to determine port configuration information of a phase tracking reference signal based on the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals; and a sending module 430, configured to send the port configuration information of the phase tracking reference signal to the terminal device.

Optionally, the obtaining module 410, the determining module 420, and the sending module 430 are configured to perform operations of the wireless communication method 200 in the embodiment of this application. For brevity, details are not described herein again.

Figure 6:
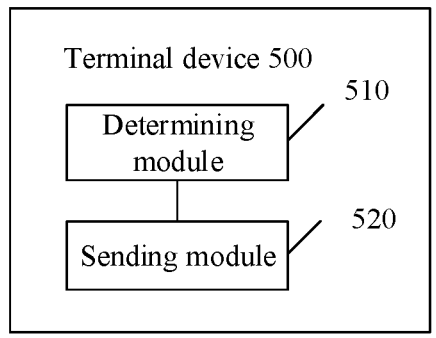
FIG. 6 is a schematic block diagram of a terminal device according to this application.

FIG. 6 is a schematic block diagram of a terminal device 500 according to this application. As shown in FIG. 6, the terminal device includes:

a determining module 510, configured to determine at least one of information about sharing a local oscillator by a plurality of transceiver units, information about phase noise errors measured on a plurality of phase tracking reference signal ports, isolation between a plurality of channels used to carry phase tracking reference signals, and status information of the channels used to carry the phase tracking reference signals, where the information about sharing a local oscillator by the plurality of transceiver units is a status of sharing a local oscillator unit by the plurality of transceiver units, and the transceiver units include receiving units or sending units; and a sending module 520, configured to send, to a network device, the at least one of the information about sharing a local oscillator by the plurality of transceiver units, the information about the phase noise errors measured on the plurality of phase tracking reference signal ports, the isolation between the plurality of channels used to carry the phase tracking reference signals, and the status information of the channels used to carry the phase tracking reference signals.

Optionally, the determining module 510 and the sending module 520 are configured to perform operations of the wireless communication method 200 in the embodiment of this application. For brevity, details are not described herein again.

The determining module 510 of the terminal device 500 in this application is further configured to determine at least one of information about sharing a local oscillator by a plurality of communications units, information about phase noise errors measured on a plurality of phase tracking reference signal ports, isolation between a plurality of channels used to carry phase tracking reference signals, and status information of the channels used to carry the phase tracking reference signals.

The determining module 510 is further configured to determine port configuration information, requested from a network device, of a phase tracking reference signal based on the at least one of the information about sharing a local oscillator by the plurality of communications units, the information about the phase noise errors measured on the plurality of phase tracking reference signal ports, the isolation between the plurality of channels used to carry the phase tracking reference signals, and the status information of the channels used to carry the phase tracking reference signals.

The sending module 520 is further configured to send the requested port configuration information of the phase tracking reference signal to the network device.

Optionally, the determining module 510 and the sending module 520 are configured to perform operations of the wireless communication method 300 in the embodiment of this application. For brevity, details are not described herein again.

The network device and the terminal device described above are respectively corresponding to the network device and the terminal device in the method embodiments, and corresponding processes are performed by the corresponding modules. For details, refer to the corresponding method embodiments.

Figure 7:
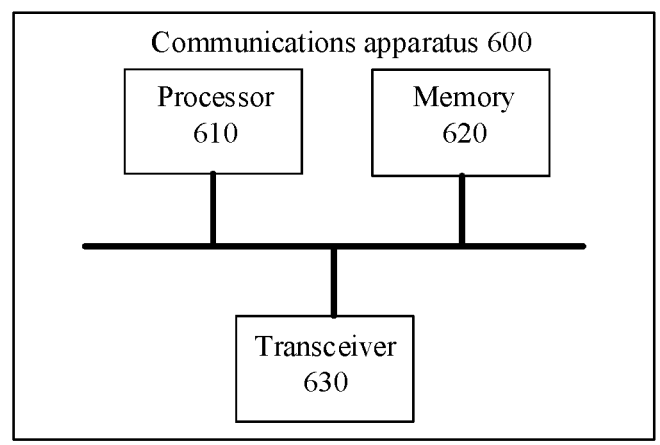
FIG. 7 is a schematic block diagram of a communications apparatus according to this application.

FIG. 7 is a schematic block diagram of a communications apparatus 600 according to this application. The communications apparatus 600 includes:

a memory 620, configured to store a program, where the program includes code;

a transceiver 630, configured to communicate with another device; and a processor 610, configured to execute the program code stored in the memory 610.

Optionally, when the code is executed, the processor 630 may implement operations in the method 200 or the method 300. For brevity, details are not described herein again. In this case, the communications apparatus 600 may be a network device or a terminal device. The transceiver 620 is specifically configured to receive and send signals under driving of the processor 630.

The communications apparatus 600 may be the network device or the terminal device described above, and perform an operation of the determining module. The transceiver may include a transmitter and/or a receiver, and perform corresponding processes of the sending module and the receiving module respectively.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, the method comprising:

determining, by a terminal device, port configuration information of a phase tracking reference signal to be reported to a network device;

determining, by the terminal device, a quantity of phase tracking reference signal ports based on a sharing status of a plurality of transceiver units of the terminal device that share a quantity of local oscillators; and sending, by the terminal device, the port configuration information of the phase tracking reference signal to the network device, wherein the port configuration information of the phase tracking reference signal comprises the quantity of phase tracking reference signal ports.

2. The method according to claim 1, wherein the port configuration information of the phase tracking reference signal further comprises:

a mapping relationship between the phase tracking reference signal and a first reference signal, wherein the first reference signal comprises a demodulation reference signal (DMRS).

3. The method according to claim 1, wherein the determining the quantity of phase tracking reference signal ports comprises:

determining that the quantity of phase tracking reference signal ports is one in response to the quantity of local oscillators that are shared by the plurality of transceiver units of the terminal device being one.

4. The method according to claim 2, further comprising:
determining the mapping relationship between the phase tracking reference signal and the first reference signal based on status information of a channel used to carry the phase tracking reference signal.

5. A wireless communication method, the method comprising:

receiving, by a network device, a communication from a terminal device; and determining, by the network device, port configuration information of a phase tracking reference signal based on the communication, wherein the port configuration information of the phase tracking reference signal comprises a quantity of phase tracking reference signal ports, wherein the quantity of phase tracking reference signal ports is based on a sharing status of a plurality of transceiver units of the terminal device that share a quantity of local oscillators.

6. The method according to claim 5, wherein the port configuration information of the phase tracking reference signal further comprises:

a mapping relationship between the phase tracking reference signal and a first reference signal, wherein the first reference signal comprises a demodulation reference signal (DMRS).

7. A terminal device, comprising:
a processor, configured to:
determine port configuration information of a phase tracking reference signal to be reported to a network device; and
determine a quantity of phase tracking reference signal ports based on a sharing status of a plurality of transceiver units of the terminal device that share a quantity of local oscillators; and a transmitter, configured to send the port configuration information of the phase tracking reference signal to the network device, wherein the port configuration information of the phase tracking reference signal comprises the quantity of phase tracking reference signal ports.

8. The terminal device according to claim 7, wherein the port configuration information of the phase tracking reference signal further comprises:

a mapping relationship between the phase tracking reference signal and a first reference signal, wherein the first reference signal comprises a demodulation reference signal (DMRS).

9. The terminal device according to claim 7, wherein the processor is further configured to:

determine that the quantity of phase tracking reference signal ports is one in response to the quantity of local oscillators that are shared by the plurality of transceiver units of the terminal device being one.

10. The terminal device according to claim 8, wherein the processor is further configured to:

determine the mapping relationship between the phase tracking reference signal and the first reference signal based on status information of a channel used to carry the phase tracking reference signal.

11. A network device, comprising:

a receiver, configured to receive a communication from a terminal device; and a processor, configured to determine port configuration information of a phase tracking reference signal based on the communication, wherein the port configuration information of the phase tracking reference signal comprises a quantity of phase tracking reference signal ports, wherein the quantity of phase tracking reference signal ports is based on a sharing status of a plurality of transceiver units of the terminal device that share a quantity of local oscillators.

12. The network device according to claim 11, wherein the port configuration information of the phase tracking reference signal further comprises:

a mapping relationship between the phase tracking reference signal and a first reference signal, wherein the first reference signal comprises a demodulation reference signal (DMRS).

* * * * *